United States Patent [19]

Jensen et al.

[11] 4,275,792
[45] Jun. 30, 1981

[54] SHOVEL WITH SOIL DIRECTING STRUCTURE

[75] Inventors: Thomas C. Jensen; Terry L. Lowe, both of Ankeny, Iowa

[73] Assignee: Deere & Company, Moline, Ill.

[21] Appl. No.: 43,115

[22] Filed: May 29, 1979

[51] Int. Cl.³ ............................................. A01B 15/02
[52] U.S. Cl. .................................... 172/703; 172/771
[58] Field of Search .............. 172/702, 703, 708, 721, 172/723, 765, 770, 771; D15/11

[56] References Cited

U.S. PATENT DOCUMENTS

| 234,321 | 11/1880 | Nellis | 172/708 |
|---|---|---|---|
| 275,546 | 4/1883 | Timms | 172/771 |
| 673,221 | 4/1901 | Perry | 172/771 |
| 681,547 | 8/1901 | Hartig | 172/771 |
| 765,061 | 7/1904 | Word | 172/771 |
| 1,165,965 | 12/1915 | Gausman | 172/771 |
| 1,641,050 | 8/1927 | Ramsey | 172/703 |
| 3,926,261 | 12/1975 | Kjellberg | 172/708 X |

FOREIGN PATENT DOCUMENTS 51758  1/1912  Austria ..................................... 172/771

OTHER PUBLICATIONS

"Shovel Equipment", *John Deere Van Brunt Model 147 "CC" Field and Orchard Cultivator*, Operator's Manual OM-M4-1155, Jan., 1955, p. 4.

Primary Examiner—Richard T. Stouffer

[57] ABSTRACT

A twisted shovel, for a chisel plow or similar implement, having a concave twisted surface. The concave surface maintains soil flow in the desired path as the shovel is moved forwardly through the soil. The soil displaced by the shovel is directed more effectively by the concave surface to one side of the shank to improve crop residue flow and incorporation, and the concave shape significantly improves the bending strength of the shovel over that of flat-twisted shovels of comparable width and thickness.

27 Claims, 6 Drawing Figures

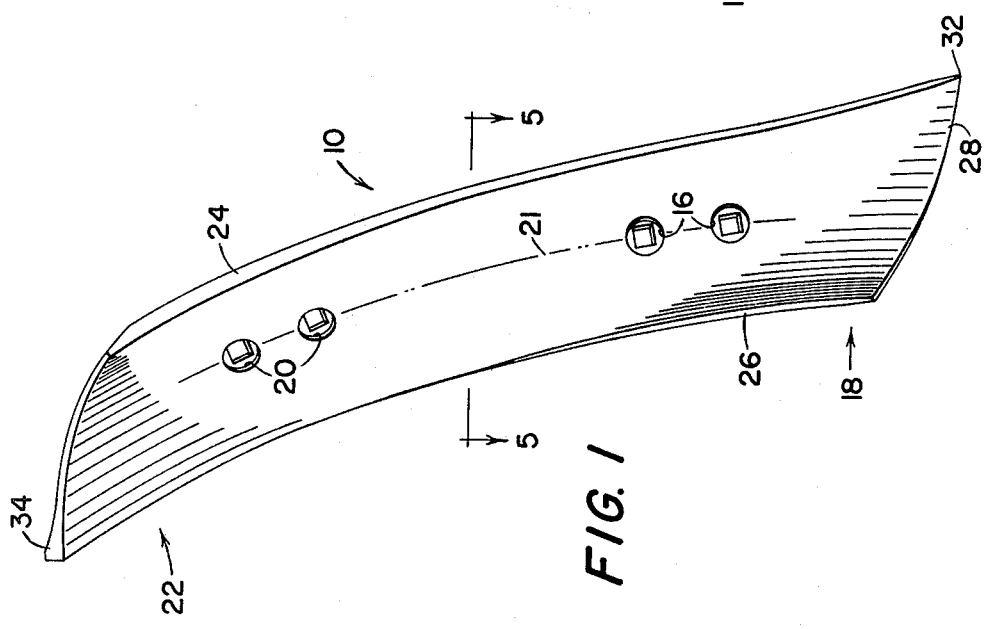

SHOVEL WITH SOIL DIRECTING STRUCTURE

BACKGROUND OF THE INVENTION

This invention relates generally to a tillage implement and more specifically to a shovel for such an implement.

Chisel plows and similar ground tillage implements have utilized a twisted shovel with a substantially flat forwardly facing surface and with forwardly facing upper and lower end portions transversely offset with respect to each other. The soil is raised by the lower portion and ideally follows the forwardly facing surface so that it is turned and falls on top of trash. Generally the upper and lower portions are offset laterally with respect to each other so that as the soil follows the forward surface around the shovel it will be displaced to one side of the groove or furrow being formed by the lower portion of the shovel. Twisted shovels are designed to lift and turn the ground to allow aeration and moisture entry and reduce soil erosion. Turning the soil results in better trash coverage and better mixing which, for example, is advantageous when fertilizer is to be incorporated into the soil.

Typical of previous twisted shovels, the soil often does not follow the forwad surface of the shovel, but instead spills over the sides of the shovel and falls back into the trench or furrow being cut. The inability of the shovels to properly direct the flow of soil is especially evident when moisture conditions are not optimum, for example when the soil is extremely dry. Often the shovel will bulldoze the soil rather than cause it to ribbon about its contour, which results in ineffective mixing and covering. In addition, the generally flat-surfaced twisted shovels often cannot direct trash flow effectively. As trash slides over the edges of the shovel rather than lifting and turning with the contour, it tends to ball up in front of the shank. Because the trash and soil do not lift and turn, coverage and mixing is reduced. Many of the advantages of utilizing the twisted shovel design, including increased trash coverage and mixing as well as better aeration and increased erosion reistance, are lost when the soil and trash do not follow the contour of the shovel.

Another disadvantage of the twisted shovels typical of previous designs is lack of resistance to bending near the portion of the shovekl which engages the soil. To increase the bending strength, shovels have typically been made thicker or wider.

BRIEF DESCRIPTION OF THE INVENTION

It is therefore an object of the present invention to provide an improved shovel for use with a chisel plow or similar tillage implement.

It is yet another object to provide a twisted shovel for an implement having improved soil and trash flow characteristics.

It is a further object to provide a twisted shovel which retains good soil and trash flow characteristics in differing types of soil with differing moisture contents. It is still another object to provide a shovel for a tillage implement having increased bending strength as compared with previously available shovels of comparable width and thickness.

It is yet a further object of the invention to provide a twisted shovel having a contoured surface for improved soil and trash flow characteristics in varying soil conditions and for increased bending strength and an improved appearance.

A twisted shovel according to the invention has a concave-twisted surface instead of the flat-twisted surface which is found on previous shovels. The concave surface maintains soil flow in the intended direction, and more effectively directing the trash and soil to one side of the shank or standard even in varying soil conditions. The concave surface significantly increases the bending strength of the shovel over that of previously available shovels of comparable width and thickness, and reduces bulldozing by inducing a ribbon flow of material.

These and other objects, features and advantages of the present invention will become apparent from the description which follows and from the drawings.

BRIEF DESCRIPTION OF THE DRAWINGS

FIG. 1 is a perspective view of a shovel according to the present invention;

FIG. 2 is another perspective view of the shovel shown in FIG. 1;

FIG. 3 is a rear view of the shovel shown in FIG. 1;

FIG. 4 is a side view of the shovel shown in FIG. 1;

FIG. 5 is a sectional view of the shovel taken along line 5—5 of FIG. 1; and

FIG. 6 is a rear view of the end portion of a shovel similar to the one shown in FIG. 1 but having a modified cutting tip.

DESCRIPTION OF THE PREFERRED EMBODIMENT

Referring now to FIGS. 1 and 2, a twisted shovel 10 is shown connected to a standard or shank 12 of a chisel plow or similar ground-working implement by a pair of plow bolts 14. The bolts extend through holes 16 in one end portion 18 of the shovel. A pair of holes 20 are provided at the opposite end portion 22 to permit the shovel to be reversed on the standard 12. As best seen in FIG. 1, the holes 16 and 20 are generally on the centerline 21 of the shovel. Alternatively the holes may be offset in the lateral direction with respect to each other so that when the shovel 10 is mounted on the standard 12 the upper portion 22 will extend a greater distance to one side of the standard than if the holes are centered.

In the preferred embodiment, the shovel 10 is formed from a length of stock metal with substantially parallel sides 24 and 26. Diagonal cutting ends 28 and 30 are provided, each having bevelled edges. The bevelled edges are formed by a forgoing process which additionally forms reinforced pointed tip memebers 32 and 34. In a modified form (FIG. 6) the cutting end 28a is pointed rather than diagonal and has a central reinforced tip 32a substantially on the centerline of the shovel. The sides 24 and 26 are bent forwardly, preferrably in such a manner that a cross-section transverse to the longitudinal axis of the shovel taken anywhere along the length of the shovel will be forwardly concave or arc-shaped as shown in FIG. 5. The shovel is also curved along its longitudinal axis so the ends 18 and 22 point generally in the forward direction (FIGS. 2 and 4). In the preferred embodiment the shovel conforms generally to a portion of a helix although it could conform to other shapes, for example spiral, distorted helix, or a simple arc. The end portions 18 and 22, however, are straight and follow lines 36 and 38 (FIG. 4) tangent to the surface of the shovel near the end portions to maintain an optimum shovel attack angle as the shovel wears and therefore prevent heeling and maintain shovel penetration. As seen in FIG. 1, the end portions extend in opposite lateral directions so that the lower end of the shovel will dig and lift soil from a position substantially ahead of the shank and the upper end will direct the flow towards one side of the shank.

The forwardly concave cross-section provides a shallow trough-like path for soil and trash with a bottom portion 40 of the trough generally located on the centerline or longitudinal axis 21 of the shovel. The material is guided around the helical contour between the forwardly facing sides 24 and 26.

The tip 32 and bevelled end 28 cut a trench or furrow in the soil as the shovel is moved forwardly. The soil and trash are turned as they ribbon around the length of the shovel, and as the material leaves the end 22 it falls to one side of the trench with the soil generally falling on top of the trash. The concave construction helps to maintain the soil and trash flow around the path so the soil is lifted and turned and falls on the trash. The transversely offset ends direct the material beside the furrow so there is more surface area for aeration and moisture absorption and so ridges are formed to prevent erosion. The concave form gives added bending strength as well as provides a more rugged appearance.

Having described the preferred embodiment it will be apparent to one skilled in the art that various modifications may be resorted to without departing from the spirit of the invention. Therefore the disclosure should not be taken to limit the invention beyond the broad concepts set forth in the appended claims.

We claim:

1. A shovel adapted for mounting on a standard of an implement for movement forwardly through the soil comprising; an elongated body member having a longitudinal axis and a lower soil-engaging end portion and an opposed upper end portion, the body member curved forwardly so that the end portions project generally in the forward direction, and including forwardly facing blunt-edged side members extending on either side of and along a major portion of the length of the body member and defining a trough-like path for the soil and wherein the soil-engaging end portion includes a leading and substantially transverse cutting edge relatively more sharp than the side members extending between the side members for cutting and lifting the soil and directing it rearwardly and upwardly in the path along the longitudinal axis.

2. The shovel as set forth in claim 1 wherein the body member has a generally arc-shaped cross-section, the side members comprising the outer portions of the cross-section.

3. The shovel as set forth in claims 1 or 2 within the body member is twisted about its longitudinal axis so that the ends are transversely offset.

4. The shovel as set forth in claims 1 or 2 including means for selectively attaching the shovel to the standard with either end in the soil engaging position, said means for attaching located adjacent the selected soil-engaging end.

5. For a ground-working implement adapted for forward movement through the soil, a shovel having an upright elongated body with opposed longitudinal flat-surfaced edge portions and a front ground contacting surface connecting the edge portions, wherein the body is bent forwardly about its longitudinal axis, and the front ground contacting surface is laterally concave substantially the entire length of the body, and wherein the body includes upper and lower forwardly facing end portions, the lower end portion including a generally transverse cutting edge relatively more sharp than the edge portions extending between the edge portions and adapted for engaging and lifting the soil along the concave surface between the edge portions and toward the upper portion for causing the soil to ribbon around the length of the shovel as the shovel is moved forwardly through the soil.

6. The shovel as set forth in claim 5 wherein the elongated body conforms substantially to the shape of a portion of a helix.

7. The shovel as set forth in claim 5 wherein the cutting edge comprises a bevelled cutting portion extending diagonally between the edge portions.

8. A shovel adapted for mounting on a standard and for moving forwardly through the soil for lifting and turning the same, the shovel comprising: an elongated member having upper and lower ends, a longitudinal axis, opposed longitudinal blunt edges, and a concave surface substantially along its entire length connecting the edges, said member curved forwardly about its axis so the ends and the concave surface extend generally in the forward direction thereby forming a concave soil-directing path extending substantially from the lower to the upper end, and wherein the lower end includes a cutting edge relatively more sharp than the blunt edges extending generally transversely to the forward direction between the edges.

9. The shovel as set forth in claim 8 wherein the elongated member is twisted about its axis so the upper and lower ends are offset laterally.

10. The shovel as set forth in claim 8 wherein the elongate member is bent to conform to a portion of a helix.

11. In a ground-working tool having a ground-engaging end for lifting soil and trash and also having a forwardly curved elongated and substantially upright portion twisted about its longitudinal axis for directing the material upwardly thereabout to turn the soil and deposit it to one side of the ground-engaging end, the improvement comprising; generally blunt sides defining the transverse borders of the elongated portion, a forwardly facing concave surface on the elongated portion extending substantially the length thereof and spacing the blunt sides approximately an equal distance apart along the elongated portion, wherein the concave surface defines a trough-like path for guiding the material and preventing it from leaving the tool before being turned, and a cutting end located at the lower end of the upright portion between the blunt sides, the cutting end including a soil cutting edge relatively more sharp than the blunt sides.

12. The tool as set forth in claim 11 wherein the concave surface is arc-shaped, the forwardly curved elongated portion also curved generally in an arc-shape, the radius of curvatures of the elongated portion being much greater than the radius of curvature of the concave surface.

13. A shovel adapted for moving forwardly through the soil for lifting and turning the same, the shovel formed from a length of metal having substantially flat, parallel sides and having a major axis in substantially an upright plane and a generally transverse minor axis, said length of metal being curved forwardly about both axes so as to have upper and lower forwardly facing end portions and a forwardly bent concave surface with the flat sides facing generally forwardly, the radius of curvature about the minor axis being much less than the radius of curvature about the major axis and wherein the lower forwardly facing end portion includes a cutting edge extending generally transversely between the sides, wherein said cutting edge is relatively more sharp than the sides.

14. The shovel as set forth in claim 13 wherein the shovel is twisted about its major axis so that the opposite ends thereof are transversely offset with respect to each other.

15. A reversible twisted shovel adapted for mounting on a standard of an implement to engage and lift the soil as it is moved forwardly comprising; an elongate body portion having a longitudinal axis and curved forwardly about the axis to form a forwardly open contour, the body also including sides bent forwardly forming a trough-like surface on the inside of the forwardly open contour, first and second forwardly projecting ground-engaging end portions on opposite ends of the body portion, each end portion including a cutting edge extending between the sides, and means on the body portion adjacent each end portion for selectively mounting the shovel on the standard in a substantially upright position with the shovel opening forwardly in the direction of travel of the implement with either end portion in a lower ground-engaging position.

16. The shovel as set forth in claim 15 wherein the sides are substantially parallel and the body portion is twisted about its longitudinal axis so that the end portions are laterally offset with respect to each other.

17. The shovel as set forth in claims 15 or 16 wherein the end portions are forwardly concave.

18. The shovel as set forth in claims 15 or 16 wherein the end portions include a forward tip located substantially on the extension of the longitudinal axis.

19. The shovel as set forth in claims 15 or 16 wherein the end portions terminate in diagonal bevelled tips.

20. A shovel adapted to be mounted on a standard of an implement and moved forwardly through the soil comprising a member formed from a substantially rectangular metal blank having major and minor axes and blunt edge portions parallel to the major axis, the blank curved forwardly about both axes and being twisted about the major axis to form a forwardly open contour having forwardly projecting and transversely offset upper and lower end portions, and a forwardly concave surface defining a soil-directing path between the edge portions extending from the lower to the upper end, wherein the lower end portion includes a soil cutting edge extending between and relatively more sharp than the blunt edge portions.

21. The shovel as set forth in claim 20 wherein the cutting surface includes a tip member centrally located and extending forwardly with respect to the edge portions.

22. The shovel as set forth in claims 20 or 21 wherein the upper end portion includes a sharpened cutting surface extending between the blunt-edge portions and wherein the shovel includes means for selectively mounting the member with either of the end portions in the soil cutting position.

23. The shovel as set forth in claim 22 wherein the means for selectively mounting is located adjacent the selected end portion.

24. A shovel adapted for mounting on a standard of an implement for movement forwardly through the soil, comprising: an elongated body member having a longitudinal axis and a lower soil-engaging end portion and an opposed upper end portion, the body member curved forwardly so that the end portions project generally in the forward direction, and including forwardly facing blunt-edged side members extending on either side of and along a major portion of the length of the body member and defining a trough-like path for the soil, wherein the soil-engaging end portion includes a leading and generally transverse cutting edge extending between the blunt-edged side members for cutting and lifting the soil and directing it rearwardly and upwardly in the path along the longitudinal axis, and wherein the upper end portion also includes a generally transverse cutting edge, said shovel including means on each end for selectively attaching the shovel to the standard with either end in the soil-engaging position, each said means for attaching located adjacent one of said transverse cutting edges.

25. For a ground-working implement adapted for forward movement through the soil, a shovel having an upright elongated body with opposed longitudinal flat-surfaced edge portions and a front ground contacting surface connecting the edge portions, wherein the body is bent forwardly about its longitudinal axis and the front ground contacting surface is laterally concave substantially the entire length of the body, said body including upper and lower forwardly facing end portions, the lower end portion including a cutting edge extending generally transversely between the edge portions, said cutting edge including a forwardly extending pointed tip member centrally positioned with respect to the edge portions and forming the lowermost extremity of the laterally concave surface for engaging and lifting the soil along the concave surface between the edge portions and toward the upper portion for causing the soil to ribbon around the length of the shovel as the shovel is moved forwardly through the soil.

26. A shovel adapted for mounting on a standard and for moving forwardly through the soil for lifting and turning the same, the shovel comprising: an elongated upright member having a longitudinal axis, upper and lower ends, opposed longitudinal blunt edges, and a concave surface substantially along its entire length connecting the edges, said member curved forwardly about its axis so the ends and the concave surface extend generally in the forward direction thereby forming a concave soil-directing path extending substantially from the lower to the upper end, and wherein the lower end includes a cutting edge extending generally transversely to the forward direction between the blunt edges, said cutting edge including a leading, centrally located pointed tip extending forwardly of the forwardmost extremities of the opposed blunt edges at the lower end, said tip so located to form the lowermost portion of the lower end.

27. In a ground-working tool having a ground-engaging end for lifting soil and trash and also having a forwardly curved elongated and substantially upright portion twisted about its longitudinal axis for directing the material upwardly thereabout to turn the soil and deposit it to one side of the ground-engaging end, the improvement comprising: generally blunt sides defining the transverse borders of the elongated portion, a forwardly facing concave surface on the elongated portion extending substantially the length thereof and spacing the blunt sides approximately an equal distance apart along the elongated portion, and a cutting end located at the lower end of the upright portion between the sides, said cutting end having a cutting edge relatively more sharp than said sides, wherein the concave surface is arc-shaped and has a radius of curvature much less than the radius of curvature of the elongated portion, wherein the lowermost portion on the arc defining said concave surface is centrally located with respect to the sides at the lower end, and wherein the cutting end includes a tip located at said lowermost portion.

* * * * *

UNITED STATES PATENT AND TRADEMARK OFFICE
CERTIFICATE OF CORRECTION

PATENT NO. : 4,275,792
DATED : 30 June 1981
INVENTOR(S) : Thomas C. Jensen and Terry L. Lowe It is certified that error appears in the above—identified patent and that said Letters Patent is hereby corrected as shown below:

Column 3, line 53, delete "within" and insert -- wherein --.

Signed and Sealed this

Thirteenth Day of April 1982

|SEAL|

Attest:

GERALD J. MOSSINGHOFF

Attesting Officer      Commissioner of Patents and Trademarks